G. JONES.
Coffee Urn.

No. 84,830.  Patented Dec. 8, 1868.

GEORGE JONES, OF NEW HAVEN, CONNECTICUT.

Letters Patent No. 84,830, dated December 8, 1868.

COFFEE-URN.

The Schedule referred to in these Letters Patent and making part of the same.

*To all whom it may concern:*

Be it known that I, GEORGE JONES, of New Haven, in the county of New Haven, and State of Connecticut, have invented a new Improvement in Coffee-Urn; and I do hereby declare the following, when taken in connection with the accompanying drawings, and the letters of reference marked thereon, to be a full, clear, and exact description of the same, and which said drawings constitute part of this specification, and represent, in—

Figure 1:
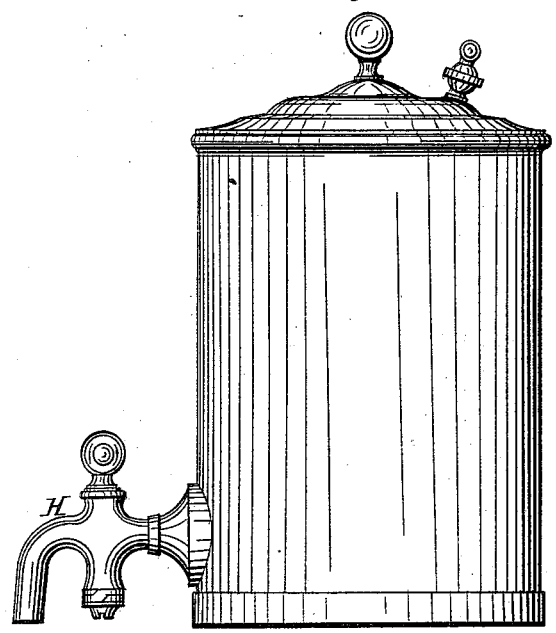

Figure 1, a side view, and in

Figure 2:
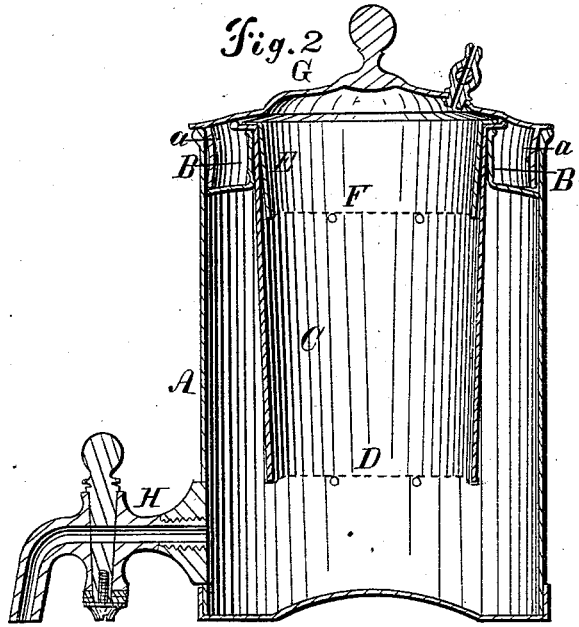

Figure 2, a vertical central section.

This invention relates to an improvement in the patent granted to Thomas Bishop, November 1, 1859, for improvement in tea and coffee-pots, of which patent I am the assignee of the entire right, as also upon the patent for which Letters Patent were granted to me, bearing date April 16, 1867, No. 63,103, the object being to adapt the same invention to a coffee-urn; and The invention consists in forming a water-joint around the cover, combined with a sprinkler and filter.

To enable others to construct and use my improvement, I will fully describe the same, as illustrated in the accompanying drawings.

A is the body of the urn, at the upper part of which is formed an annular chamber, B, through the centre of which is set a cylinder, C, with its perforated bottom D, and into this is set the sprinkler E, with its perforated bottom F, all in like manner as the patent of Bishop, aforesaid.

The cover G is provided with a flange, a, which sets into the chamber B, so that when the chamber is partially filled with water, the flange, setting into the chamber, forms a tight packing for the joint of the cover.

In the patent of Bishop a communication was formed from the chamber B by a spout leading from the body of the pot, so that, when the pot was turned for pouring the coffee, the water in the chamber B would run out with the coffee.

In an urn there is no occasion for tipping the body, therefore the water-joint may be maintained, the body always standing in the same position, by which means the coffee may be retained within the pot, losing none of its aroma and flavor, for any length of time, being perfectly air-tight.

I describe the urn as for coffee, but it is equally applicable and possesses the same advantage as a tea-urn, and the operation is the same as Bishop's patent, which is as follows:

The tea or coffee is first placed upon the perforated bottom D of the cylinder C, then the cup E is placed into the cylinder C, and boiling water poured upon the coffee below, until a sufficient quantity has been poured thereon. The chamber B is partially filled with water, hot or cold, then the cover placed thereon, and the whole allowed to stand for five minutes, and the coffee is prepared in the most perfect manner and ready for use, and is drawn out through the faucet H.

I do not wish to be understood as claiming anything secured in the patent of Bishop, aforesaid; but What I do claim as new and useful, and desire to secure by Letters Patent, is—

In combination with the perforated cylinder C within the body A of the urn, the arrangement of the annular chamber B and flange a of the cover, without communication from the chamber B to the urn below, substantially as and for the purpose set forth.

GEO. JONES.

Witnesses:
JOHN H. SHUMWAY,
A. J. TIBBITS.